US008007599B2

United States Patent
Coccia et al.

(10) Patent No.: US 8,007,599 B2
(45) Date of Patent: Aug. 30, 2011

(54) APPARATUS FOR WASHING CIRCUITS INVOLVED IN THE PREPARATION OF MILK-BASED BEVERAGES

(75) Inventors: Andrea Coccia, Binasco (IT); Dario Sala, Binasco (IT)

(73) Assignee: Gruppo Cimbali S.p.A., Binasco (IT)

( * ) Notice: Subject to any disclaimer, the term of this patent is extended or adjusted under 35 U.S.C. 154(b) by 653 days.

(21) Appl. No.: 12/219,237

(22) Filed: Jul. 17, 2008

(65) Prior Publication Data

US 2009/0038655 A1 Feb. 12, 2009

(30) Foreign Application Priority Data

Aug. 7, 2007 (EP) ..................... 07425515

(51) Int. Cl.
*B08B 9/02* (2006.01)
*A47J 31/44* (2006.01)

(52) U.S. Cl. .............. 134/166 C; 134/168 R; 99/290; 99/453

(58) Field of Classification Search ............... 134/166 C
See application file for complete search history.

(56) References Cited

U.S. PATENT DOCUMENTS

2009/0314165 A1* 12/2009 Blockwoldt et al. ............ 99/288

FOREIGN PATENT DOCUMENTS

| EP | 1656863 | 11/2004 |
| EP | 1797801 | 7/2006 |
| EP | 1 797 801 | 6/2007 |

OTHER PUBLICATIONS

European Search Report for EP 07 42 5515.9.

* cited by examiner

*Primary Examiner* — Michael Barr
*Assistant Examiner* — Jason P Riggleman
(74) *Attorney, Agent, or Firm* — Nixon & Vanderhye PC

(57) ABSTRACT

Apparatus for washing hydraulic circuits involved in the preparation of milk-based beverages in machines for automatically dispensing hot drinks and/or in machines for preparing and supplying espresso coffee, said circuits comprising at least one first hydraulic path which extends between a point for detachable connection to a milk storage vessel and the orifice of at least one pouring spout of a delivery device. A motor-driven pump is arranged along said first hydraulic path and valve means allow washing liquid, drawn from a source to reach said first hydraulic path. The apparatus envisages a hollow, detergent-containing, cartridge provided with unions which, when it is required to perform washing, allow connection of the orifice of said at least one pouring spout supplied by said first hydraulic path to the said connection point which can be detached from the milk source.

5 Claims, 4 Drawing Sheets

APPARATUS FOR WASHING CIRCUITS INVOLVED IN THE PREPARATION OF MILK-BASED BEVERAGES

This application claims priority to Europe Application No. 07425515.9, filed 7 Aug. 2007, the entire contents of which is hereby incorporated by reference.

BACKGROUND OF THE INVENTION

The present invention relates to an apparatus for washing hydraulic circuits involved in the preparation of milk-based beverages in machines for automatically dispensing hot drinks and/or in machines for preparing and supplying espresso coffee, said circuits comprising at least one first hydraulic path which extends between a point for detachable connection to a milk storage vessel and the orifice of at least one pouring spout of a delivery device, at least one second hydraulic path which extends between a steam source and the same orifice of the said pouring spout of the delivery device, a motor-driven pump arranged along said first hydraulic path, intercept valve means situated along said second hydraulic path, a washing liquid source, a line connecting said source and said valve means situated along said second hydraulic path as well as intercept valve means situated along said connection line.

An example of the above mentioned apparatus is disclosed in EP-A-1,797,801.

As is known, in machines for automatically dispensing hot drinks and in professional automatic machines designed for bars, circuits and specific devices are used for heating and frothing the milk, the latter being in particular intended to form the beverage which is known by the name of "cappuccino".

Such circuits comprise a milk source which may be a refrigerated storage vessel containing fresh milk or an apparatus which produces liquid milk by mixing, inside a special device, cold water with condensed milk drawn from its container by means of a special pump.

The milk, however supplied, is then conveyed by means of a pump to a delivery device which usually also performs the function of heating and forming the froth.

Heating of the milk is usually performed using the heat from condensation of the steam supplied by a special generator via an intercept valve. From the delivery device, the heated and in some cases frothed milk, to which if necessary coffee is added, flows into a cup situated underneath the spouts of the delivery device.

All the paths of the hydraulic circuit affected by the flow of the milk must be cleaned frequently and regularly and it is advisable for cleaning to be accompanied often also by a disinfecting operation.

The term "cleaning" used below in the present description is understood as meaning disinfecting operations and the subsequent rinsing operations.

In accordance with the prior art, the circuit sections which are inside the delivery unit, leading to the pouring spouts, are cleaned by detaching the said delivery device from the machine and disassembling its component parts. The operation is made easier by the fact that the delivery device is normally connected to the machine by means of a fast-action coupling system which connects both the hydraulic circuit from the milk storage vessel and the circuit from the steam source.

Cleaning of the circuits inside the machine, since these cannot be removed by the operator, is performed by activating processes which cause cleaning liquid to flow inside them.

In accordance with a conventional known cleaning technique, washing of the paths of the circuits inside the machine along which the milk flows envisages the connection, by means of a special intercept valve, of these paths to an external source of washing liquid which may be water, to which a disinfectant is added if necessary and which may also be hot, being supplied, for example, from the machine boiler.

During the washing operation, the liquid is made to flow inside the hydraulic circuits which communicate with the exterior via the pouring spouts of the delivery device. The liquid used is therefore continuously discharged without recycling. Since the action of the cleaning liquid is not immediate, in accordance with the prior art specified above, it is necessary for the liquid to flow for a certain period of time, therefore resulting in a large amount of washing liquid being used.

Moreover, especially in the case where hot or boiling water is used, the flow of this liquid outside the machine may result in the risk of scalding of the operator, should he/she inadvertently place a hand underneath the spouts of the delivery device.

SUMMARY OF THE INVENTION

The object of the present invention is to simplify and automate the cleaning operations in machines of the type mentioned above, extending these operations also to the internal pipes of the delivery device without having to detach it from the machine and disassemble it into its component parts.

A further object is to reduce the consumption of the cleaning liquid, optimising at the same time the efficiency of the washing action produced by the washing liquid inside the hydraulic circuits undergoing treatment.

These and other objects, which will appear more clearly from the continuation of the description, are achieved by an apparatus for washing hydraulic circuits involved in the preparation of milk-based beverages in machines for automatically dispensing hot drinks and/or in machines for preparing and supplying espresso coffee, comprising a beverage delivery device, at least one pouring spout having an orifice on the beverage delivery device, a milk storage vessel and a steam source, said circuits comprising at least one first hydraulic path which extends from the orifice of said at least one pouring spout of the beverage delivery device, said first hydraulic path being provided with a connection point for a detachable connection to said milk storage vessel, at least one second hydraulic path which extends between said steam source and the same orifice of the said pouring spout of the delivery device, a motor-driven pump arranged along said first hydraulic path, intercept valve means located along said second hydraulic path, a washing liquid source, a connection line connecting said washing liquid source and said valve means located along said second hydraulic path as well as valve means for intercepting said connection line, and means for connecting the orifice of said at least one pouring spout to said connection point of the first hydraulic path which is detachable from the milk storage vessel.

BRIEF DESCRIPTION OF THE DRAWINGS

The characteristic features and advantages of the present invention will emerge more clearly from the following detailed description of a preferred practical embodiment thereof illustrated by way of a non-limiting example in the accompanying drawings in which.

Figure 1:
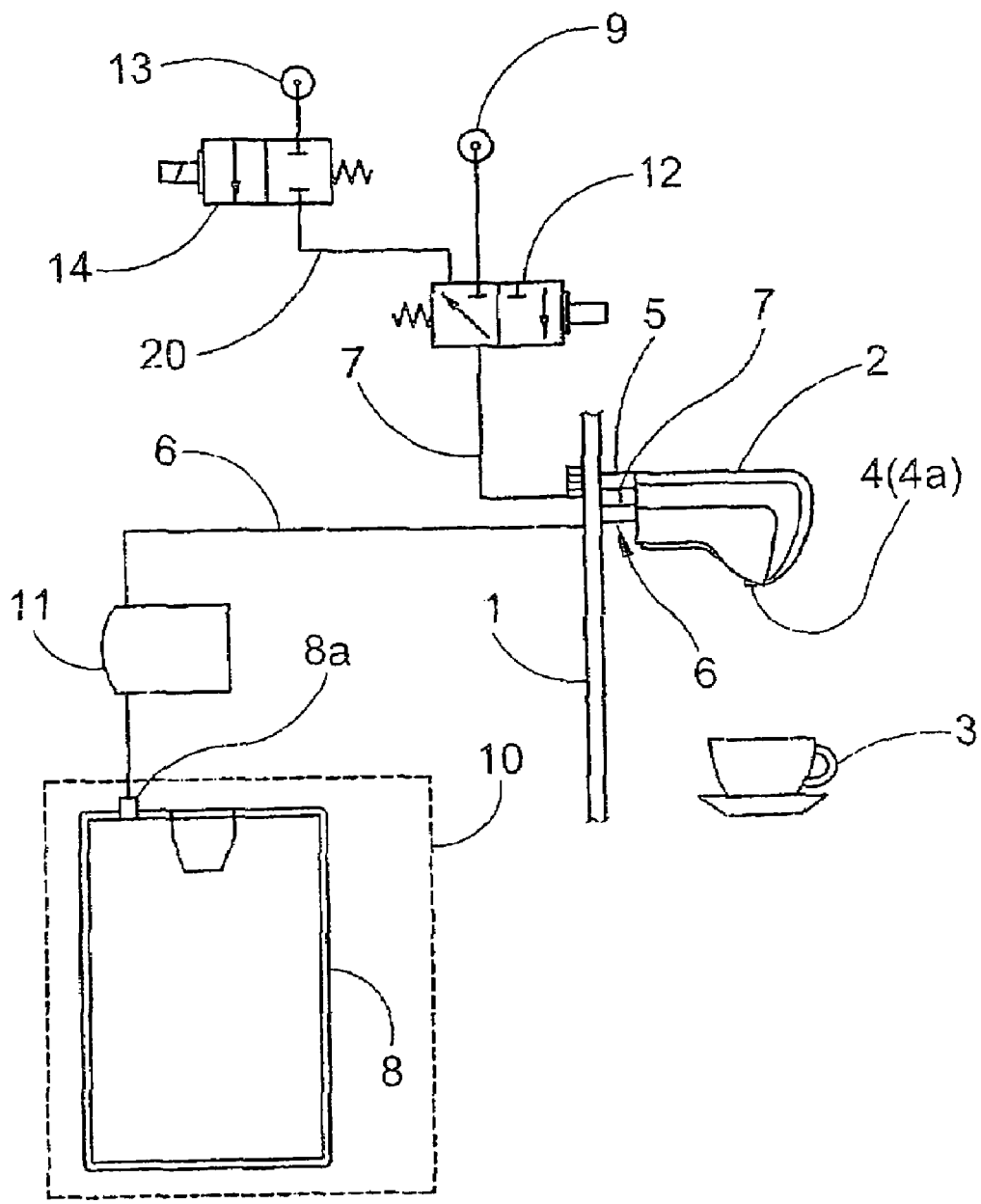
FIG. 1 shows, in schematic form, the circuitry of the apparatus according to the invention in its embodiment which is particularly suitable for machines using fresh milk for preparation of the beverage, in the operating condition for delivery of the beverage.

With reference to the abovementioned figures and in particular to FIG. 1, 1 denotes schematically the front wall of a machine for preparing hot milk-based beverages, for example a professional machine for use in bars which is capable of producing and supplying "cappuccino". Alternatively, said wall may also form part of a machine for automatically dispensing similar beverages.

The wall 1 has, connected thereto, in a conventional manner, one or more delivery devices 2 which, also conventionally, when they are intended to supply milk-based beverages, comprise devices for frothing the milk as well as for heating it. These devices, being known per se, are not described in detail.

The prepared beverage passes from the delivery device 2 to an underlying cup 3 via one or more pouring spouts 4, 4a.

Again in a conventional manner, the delivery device 2 is connected to the wall 1 by means of a front coupling device—schematically indicated by 5—by means of which the hydraulic connections to the lines 6 and 7 are also performed, said lines forming the connections to the milk source 8 and to the steam source 9, respectively. As illustrated in FIG. 1, the source 8 is in the form of a storage vessel housed in a refrigerated environment 10 so that fresh milk may be used.

A pump 11 is arranged along the line 6, being operated conventionally by an associated electric motor. The pump 11 may be, for example, of the peristaltic type or gear type.

In accordance with the preferred embodiment of the apparatus according to the invention, the line 6 extends from a detachable connection point 8a with a structure of the conventional type, via which it is connected to the milk source 8 and the orifice of the spout, 4 and/or 4a, for pouring the milk-based beverage, situated on the delivery device 2.

Along the steam supply line 7 the apparatus envisages valve means 12 which open and close, upon emission of a command by the machine operating cycle, the steam supply to the delivery device 2.

In accordance with the invention, the apparatus comprises a source 13 of washing liquid, which may be for example tap water, intercepted by valve means 14 and connected, by means of a line 20, to the valve means 12 which, when required by the cycle, connect it to the line 7, intercepting at the same time the steam source 9.

In accordance with the invention, washing of the line 6, along which the milk-based beverage flows, is performed by means of a box-shaped cartridge 22 with an internal cavity 23. The cartridge 22 is provided with unions 24 and 24a by means of which it is engaged onto the pouring spouts 4 and 4a of the delivery device 2, as well as a bottom outlet with external union 25. Alternatively, the cartridge 22 will be provided with only one of the unions 24 or 24a, should the delivery device 2 have only one pouring spout, 4 or 4a, for the milk-based beverage.

In accordance with a further alternative, the cartridge 22 may not have the unions 24 and 24a and have only one opening which, when the cartridge is positioned underneath the pouring spouts 4 and/or 4a, said spouts are free to discharge the liquid flow which passes through them directly inside the cartridge 22 without requiring a mechanical connection with the latter.

The way in which the unions 24 and 24a of the cartridge 22 are engaged onto the pouring nozzles 4 and 4a of the delivery device 2 is conventional and of the type which also allows rapid removal of the said cartridge 22 when required at the end of a washing operation.

The cavity 23 may contain a detergent substance or a disinfecting substance or both.

The cartridge 22, in an economically advantageous embodiment, may be designed so as to have disposable characteristics and may contain one or more measured amounts of products for cleaning the circuits.

Figure 2:
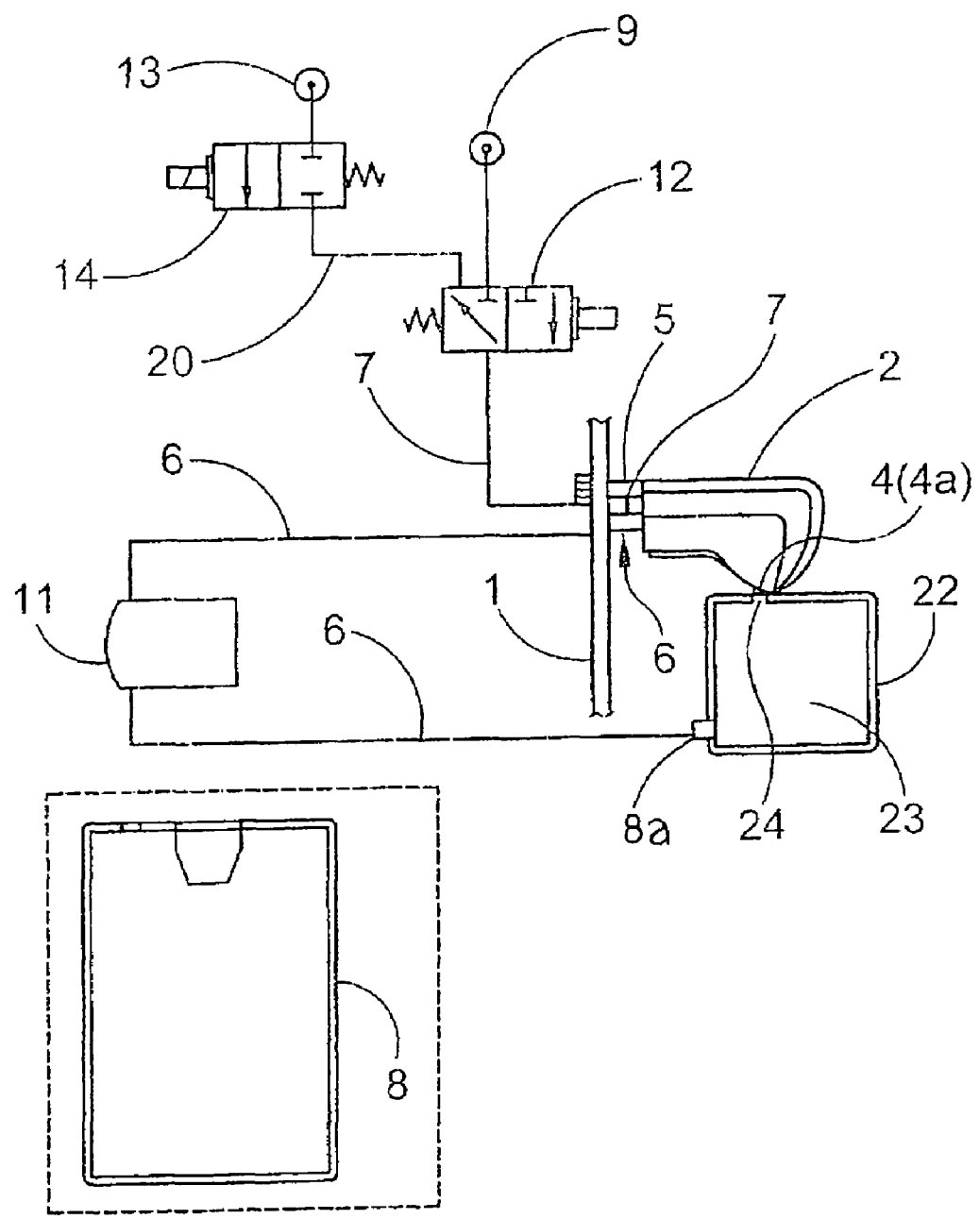
FIG. 2 shows the apparatus according to FIG. 1 in the condition for washing the circuits along which the milk flows, with the delivery device kept in position on the machine and connected to a washing cartridge.
Figure 3:
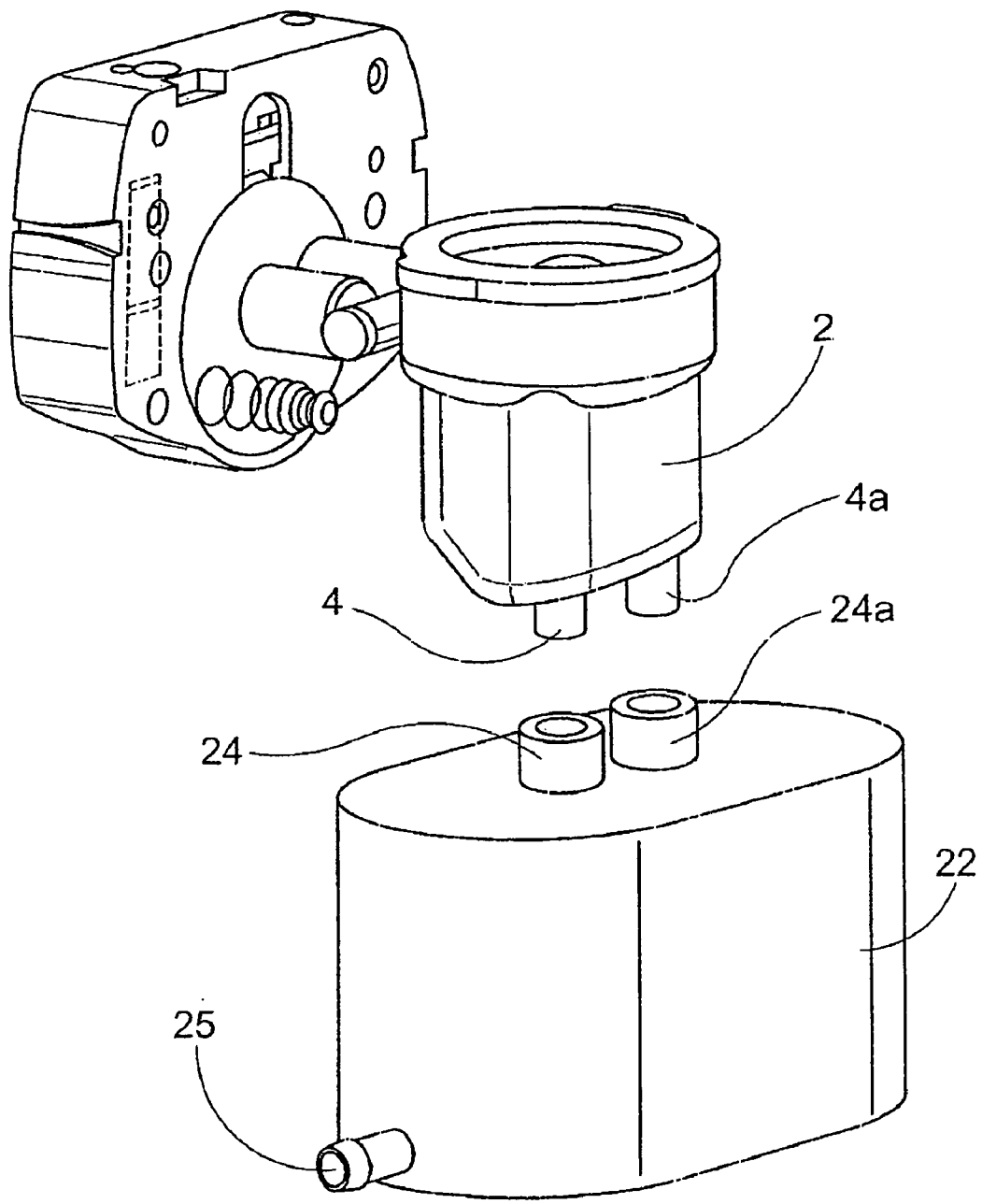
FIG. 3 shows the delivery device with a washing cartridge positioned underneath the pouring spouts prior to connection to the latter.
Figure 4:
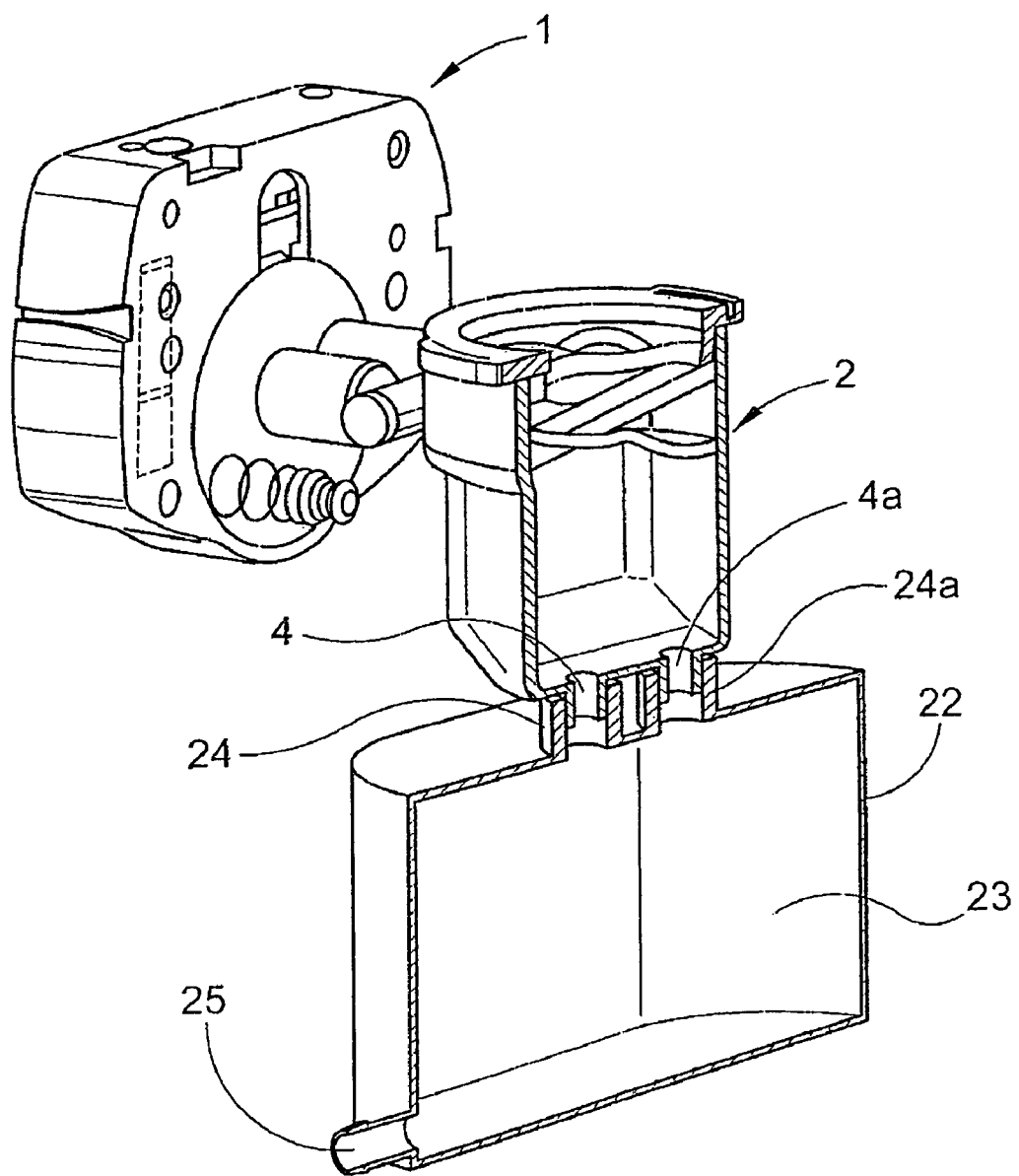
FIG. 4 shows a partially sectioned schematic view of a washing cartridge and a delivery device connected together to form the washing apparatus according to the invention.

From that described above it can be understood that, during operation of the machine, in the embodiment according to FIGS. 1 and 2, the line 6 and its sections which extend inside the delivery device 2 together with the chambers and conventional pipes of the milk frothing device, are passed along by the flow of heated milk where necessary frothed by the steam which is supplied by the source 9 via the line 7 and the valve 12.

They therefore require periodic cleaning.

In accordance with the apparatus according to the invention and as shown in FIG. 2, this cleaning operation is performed by engaging the cartridge 22 onto the ends of the pouring spouts 4 and 4a.

At the same time the valve 12 is operated so as to be positioned such that it interrupts the supply of the steam to the delivery device 2 and connects, via the line 20, the line 7 to the source 13 of washing liquid. Moreover, the line 6 is disconnected from the connection point 8a via which it is connected to the storage tank 8 and manually engaged onto the union 25 provided on the bottom of the cartridge 22. Opening of the valve 14 causes a given quantity of washing liquid to be supplied into the circuit from the source 13, following which it is closed.

As can be seen from FIG. 2, with the valve means 14 in the closed position as described above, a closed circuit is formed for the line 6 via the cartridge 22, connected to the spouts 4, 4a, of the delivery device 2, this closed circuit comprising also the internal sections of the delivery device, the devices for heating and frothing the milk as well as the internal cavity 23 of the cartridge 22. The washing liquid is circulated by the motor-driven pump 11 for a sufficient amount of time to remove from the walls of the lines any incrustations of milk formed during use of the machine. In the case of a motor-driven gear pump or peristaltic pump, circulation of the washing liquid may also advantageously be reversed and performed alternately in the two opposite senses, increasing the efficiency thereof.

During this recirculation stage, via the valve means 12, steam may be introduced into the washing liquid for a sufficient amount of time to raise it to a temperature suitable for disinfection.

At the end of a predetermined time period, once the washing operation has been completed, the line 6 is disconnected from the union 25 and connected again to the milk storage vessel 8 as shown in FIG. 1.

The cartridge 22 is removed from the delivery device 2 and the machine is ready to perform its normal beverage delivery functions.

In the case where the cartridge 22 used contains inside it a disinfecting substance, the washing cycle may be repeated with the cartridge clean for performing rinsing.

In the case where washing is performed using only water without additives, rinsing may consist only in a brief discharge of water from the spouts 4, 4a of the delivery device 2 after removal of the cartridge 22.

It is understood that other embodiments, in addition to that described and illustrated, may be implemented by a person skilled in the art without thereby departing from the scope of the present invention as claimed below.

What is claimed is:

1. An apparatus for washing hydraulic circuits involved in the preparation of milk-based beverages in machines for automatically dispensing hot drinks and/or in machines for preparing and supplying espresso coffee, comprising a beverage delivery device, at least one pouring spout having an orifice on the beverage delivery device, a milk storage vessel and a steam source, said circuits comprising at least one first hydraulic path which extends from the orifice of said at least one pouring spout of the beverage delivery device, said first hydraulic path being provided with a connection point for a detachable connection to said milk storage vessel, at least one second hydraulic path which extends between said steam source and the same orifice of the said pouring spout of the delivery device, a motor-driven pump arranged along said first hydraulic path, intercept valve means located along said second hydraulic path, a washing liquid source, a connection line connecting said washing liquid source and said valve means located along said second hydraulic path as well as valve means for intercepting said connection line, and means for connecting the orifice of said at least one pouring spout to said connection point when it is detached from the milk storage vessel to enable washing liquid from said second hydraulic path to be circulated through said first hydraulic path to thereby clean the first hydraulic path.

2. An apparatus according to claim 1, wherein said means for connecting the orifice of said at least one pouring spout to said detached connection point of said first hydraulic path comprises a cartridge provided with a closed internal cavity, with first means for connection to the said orifice as well as with second means for connection to said point for detached connection point of the first hydraulic path.

3. An apparatus according to claim 2, wherein said cartridge is provided with coupling members for connection to the orifice of the pouring spouts of the delivery device.

4. An apparatus according to claim 2, wherein in that said cartridge includes a cavity containing a measured amount of detergent and/or disinfecting substance.

5. An apparatus according to claim 2, wherein said cartridge is of the disposable type.

\* \* \* \* \*